United States Patent
Hasegawa

[19]

[11] Patent Number: 6,012,347
[45] Date of Patent: Jan. 11, 2000

[54] POWER STEERING APPARATUS

[75] Inventor: Akira Hasegawa, Kakegawa, Japan

[73] Assignee: Toyota Jidosha Kabushiki Kaisha, Toyota, Japan

[21] Appl. No.: 08/939,206

[22] Filed: Sep. 29, 1997

[30] Foreign Application Priority Data

Nov. 5, 1996 [JP] Japan .................................. 8-292910

[51] Int. Cl.[7] .................................................. B62D 5/04
[52] U.S. Cl. ..................... 74/388 PS; 74/498; 74/640; 180/443
[58] Field of Search .................. 74/388 PS, 498, 74/640; 180/443, 444, 445

[56] References Cited

U.S. PATENT DOCUMENTS

| 3,172,299 | 3/1965 | Musser | 74/388 PS |
|---|---|---|---|
| 3,511,104 | 5/1970 | Piat | 74/388 PS |
| 4,044,274 | 8/1977 | Ohm | 74/640 |
| 4,619,156 | 10/1986 | Kiryu | 74/640 |
| 4,629,024 | 12/1986 | Buike et al. | 74/388 PS |
| 4,656,409 | 4/1987 | Shimizu | 74/388 PS |
| 4,751,976 | 6/1988 | Higuchi et al. | 74/388 PS |
| 4,825,720 | 5/1989 | Capdepuy | 74/640 |

FOREIGN PATENT DOCUMENTS

| 62-214055 | 9/1987 | Japan . |
|---|---|---|
| 63-8462 U | 1/1988 | Japan . |
| 63-46939 | 2/1988 | Japan . |
| 5-209655 | 8/1993 | Japan . |

Primary Examiner—Tamara L. Graysay
Assistant Examiner—William C. Joyce
Attorney, Agent, or Firm—Oliff & Berridge, PLC

[57] ABSTRACT

In conventional power steering apparatus, a motor and a reducing device of this motor were set in a laterally projecting state with respect to the steering axis, which posed a problem of poor mountability. Harmonic drive reducer, which is composed of wave generator, flexspline, and circular spline, and print motor for driving it are coaxially arranged with respect to a serial steering axis connecting steering input shaft with steering output shaft.

9 Claims, 13 Drawing Sheets

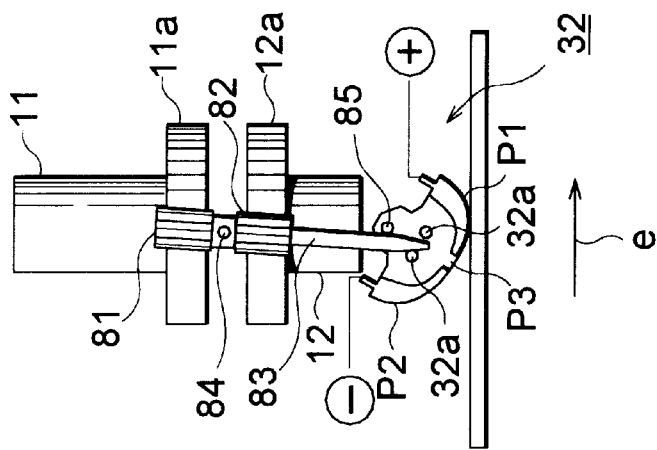
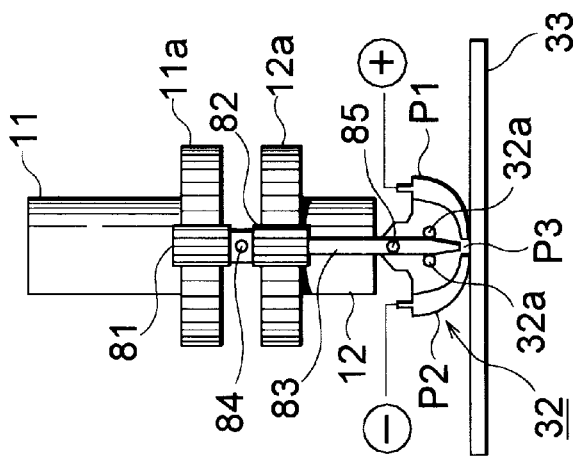
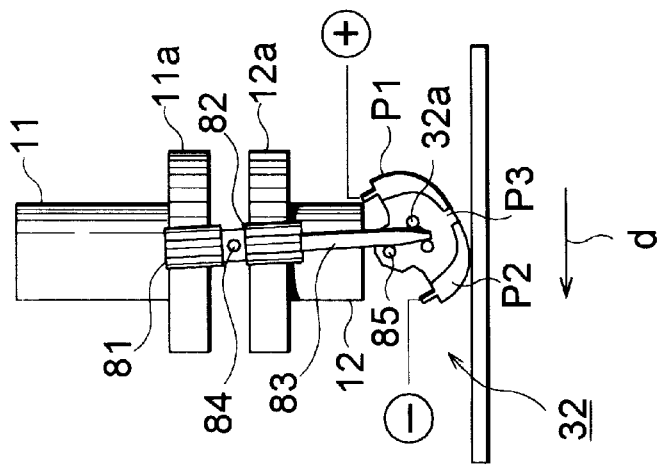

1

POWER STEERING APPARATUS

BACKGROUND OF THE INVENTION

1. Field of the Invention

The present invention relates to a power steering apparatus for assisting steering operation by generating steering assist force by driving force of motor during steering operation of car or the like.

2. Related Background Art

An example of such power steering apparatus of an electric motor type is shown in FIG. 13 (Japanese Laid-open Patent Application No. Sho 62-214055). Pinion shaft 101 in mesh with rack 102 is connected through torsion bar 104 to steering shaft 103 and the tip of steering shaft 103 is connected to a steering wheel not illustrated. In the periphery around the torsion bar 104, spur gear 105 is provided so as to rotate together with these pinion shaft 101, torsion bar 104, and steering shaft 103, and this spur gear 105 is connected in mesh through intermediate gear 106 with gear 107, thus composing a reducing unit. Then this gear 107 is connected through clutch 108 to an output shaft of electric motor 109. This structure forms a mechanism for transmitting the driving power of electric motor 109 through the clutch 108, gear 107, and intermediate gear 106 to the spur gear 105, thereby supplying the steering assist force during the steering operation.

SUMMARY OF THE INVENTION

The conventional power steering apparatus was arranged to supply the steering assist force as described above, but this structure had a problem of poor mountability, because the electric motor 109 and reducing unit were disposed in the laterally projecting state with respect to a serial steering axis including the steering shaft 103 and pinion shaft 101 whereby the outer dimensions of a steering gear box housing these increased by that degree.

The present invention has been accomplished to solve this problem and an object thereof is to provide a new power steering apparatus with enhanced mountability and in more compact arrangement than the conventional power steering apparatus as described.

A first power steering apparatus is a power steering apparatus comprising a steering input shaft, a steering output shaft, and assist force generating means for supplying steering assist force to the steering output shaft, wherein the assist force generating means comprises: a motor arranged coaxially with a serial steering axis connecting the steering input shaft with the steering output shaft; a wave generator connected to an output shaft of the motor, the wave generator constituting an elliptic cam; a flexspline mounted to a peripheral portion of the wave generator, arranged to be deformed elastically by the wave generator under rotation, and supported on a housing; and a circular spline connected to the steering output shaft and arranged to be driven to rotate in mesh with the flexspline.

The wave generator, flexspline, and circular spline compose a so-called harmonic drive reducer, and this harmonic drive reducer and the motor for driving it are arranged coaxially with the steering axis.

A second power steering apparatus is a power steering apparatus according to the first power steering apparatus, wherein the motor is a print motor and wherein the wave generator is connected to a rotor of this print motor.

In this arrangement, the wave generator forming the harmonic drive reducer is directly driven to rotate by the rotor of the print motor.

A third power steering apparatus is a power steering apparatus according to the first or second power steering apparatus, wherein the flexspline has such a shape that one opening end thereof is folded back outside.

The flexspline, even in a fixed state at one end, needs to have a length enough for the other end to be deformed elastically. When the flexspline is of the folded shape as described, the total length of the flexspline within a fixed range can be increased, which can contribute to compactification of apparatus.

A fourth power steering apparatus is a power steering apparatus according to the first, second, or third power steering apparatus, further comprising: a second wave generator arranged to be driven to rotate by the steering input shaft; a second flexspline mounted to a peripheral portion of the second wave generator and arranged to be deformed elastically by the second wave generator under rotation; a second circular spline arranged to be driven to rotate in mesh with the second flexspline and connected to the steering output shaft; and torque detecting means disposed with respect to the second flexspline and arranged to detect torsional torque applied to this second flexspline.

The second wave generator is directly driven to rotate by the steering input shaft, thereby elastically deforming the second flexspline mounted to the peripheral portion thereof. The second circular spline connected to the steering output shaft is driven to rotate by the second flexspline thus elastically deformed. Therefore, the both of the steering force from the steering input shaft and the steering assist force from the assist force generating means are applied to the steering output shaft.

Driving torque proportional to steering torque supplied to the steering input shaft is applied to the second circular spline and the second flexspline receives reaction of this driving torque. This reaction acts to twist the second flexspline fixed at one end. Therefore, by detecting the torsional torque applied to the second flexspline by the torque detecting means, the steering torque applied to the steering input shaft can be detected based on the result of this detection.

A fifth power steering apparatus is a power steering apparatus according the first power steering apparatus, further comprising torque limiting means for releasing constraint of the flexspline.

When the constraint of the flexspline is released, connection between the steering output shaft and the assist force generating means is released, whereby the steering output shaft becomes rotatable relative to the assist force generating means. Owing to this, for example, even when some trouble occurs in the motor to lock the motor, the constraint of the flexspline is released, so as to prevent the steering operation from being impeded. If the constraint of the flexspline is released at very small steering torque, the inertial force of the motor or the like will be prevented from affecting the steering operation, which can improve the feeling of steering.

A sixth power steering apparatus is a power steering apparatus according to the second power steering apparatus, comprising: a displacing member arranged to be driven to undergo displacement by a relative twist between the steering input shaft and the steering output shaft; and a brush having electrodes of mutually different polarities, the brush being arranged to switch the electrode in contact with the rotor of the print motor to the other when driven to undergo displacement by the displacing member.

The displacing member is driven based on the relative twist, i.e., mechanical displacement, between the steering input shaft and the steering output shaft. Therefore, switching control of power supply to the rotor of the print motor can be carried out on a mechanical basis, which obviates a need for separately providing a torque sensor, a steering-direction sensor, and so on. Thus, rotation control of the print motor can be carried out by the simple arrangement.

A seventh power steering apparatus is a power steering apparatus according to the first power steering apparatus, further comprising driving means for driving to rotate the flexspline.

When the flexspline is rotated by the driving means, arbitrary change becomes possible in gear ratio of the harmonic drive reducer composed of the wave generator, flexspline, and circular spline. In addition, auxiliary steering can also be carried out by arbitrarily performing the rotation control of the flexspline by the driving means.

A eighth power steering apparatus is a power steering apparatus according the first power steering apparatus, wherein the motor is a coreless motor a rotor of which is tubular.

Since this arrangement of the motor achieves such structure that magnets are arranged along the tubular rotor, the motor is shaped to extend along the direction of the center axis thereof, which can decrease the outside diameter of the motor.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 10A, 10B, and 10C are explanatory drawings to show the switching mechanism of brush.

DESCRIPTION OF THE PREFERRED EMBODIMENTS

Embodiments of the power steering apparatus according to the present invention will be described with reference to the accompanying drawings.

Figure 1:
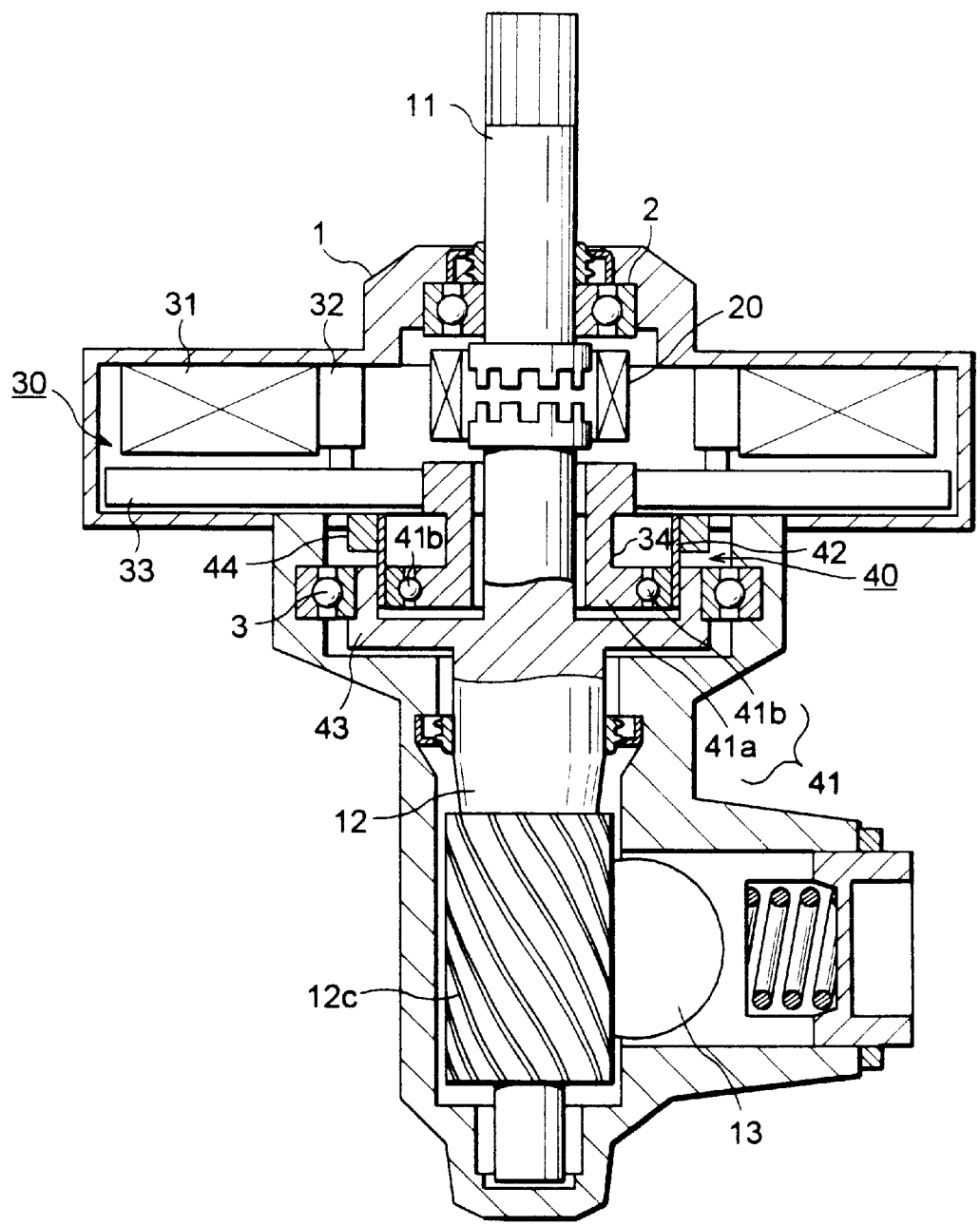
FIG. 1 is a cross-sectional view to show the power steering apparatus according to the first embodiment.

FIG. 1 shows the power steering apparatus according to the first embodiment.

This power steering apparatus is constructed in such a mechanism that print motor 30 and harmonic drive reducer 40 are arranged coaxially with the steering axis connecting steering input shaft 11 with steering output shaft 12 and that rotational output of this print motor 30 is supplied through the harmonic drive reducer 40 to the steering output shaft 12.

One end of the steering input shaft 11, not illustrated, is connected through a steering shaft to a steering wheel and the steering input shaft is rotatably supported by bearing 2 fixed in housing 1. This steering input shaft 11 is connected through a torsion bar (reference numeral 14 in FIG. 3) to the steering output shaft 12.

A circular spline, described below, is formed integrally with the steering output shaft 12 and this circular spline 43 is rotatably supported by bearing 3 fixed in the housing 1. Pinion gear 12c is formed at one end of this steering output shaft 12 and is in mesh with rack 13 for steering operation of car.

Steering torque sensor 20 for detecting the steering torque is provided at a butt portion between the steering input shaft 11 and the steering output shaft 12. When the steering torque is supplied to the steering input shaft 11, a relative twist occurs between the steering input shaft 11 and the steering output shaft 12, so as to change the butt condition of projected and depressed teeth formed on the opposed ends of the two shafts. Since this changes magnetic reluctance between them, the steering torque sensor 20 detects the steering torque, based on this change of magnetic reluctance.

In the print motor 30, magnet 31 and brush 32 are fixed to the housing 1 and disk-shaped print coil 33, which is a rotor of this motor, is arranged to face the magnet 31 and the brush 32. The brush 32 is in contact with the print coil 33, so that power is supplied through this brush 32 to the print coil 33. The print coil 33 is connected at the central portion thereof to cylindrical motor output shaft 34 extending along the steering axis, and the other end of this motor output shaft 34 is fixed to cam portion 41a of wave generator 41. Therefore, the print coil 33 and wave generator 41 are integrally connected through the motor output shaft 34. When the print coil 33 is driven to rotate, the wave generator 41 is also driven to rotate together therewith. This print motor 30 is subjected to rotation control based on a detection signal of the steering torque sensor 20.

The harmonic drive reducer 40 is constructed in such an arrangement that the wave generator 41 forming an elliptic cam is disposed around the steering axis, endless flexspline 42 is mounted to the peripheral portion thereof, and circular spline 43 is provided further to the peripheral portion thereof.

Figure 2:
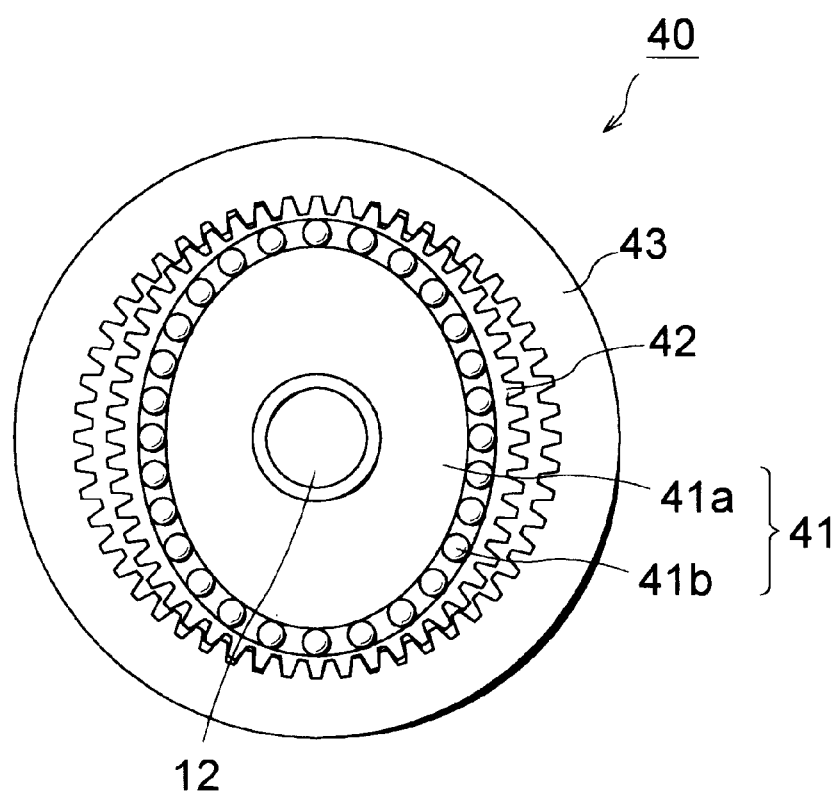
FIG. 2 is a plan view to schematically show the structure of the harmonic drive reducer.

FIG. 2 schematically shows only the harmonic drive reducer extracted. The wave generator 41, located in the peripheral portion of the steering output shaft 12, is constructed in such structure that ball bearing 41b is disposed on the peripheral portion of the elliptic cam portion 41a, an inner ring of this ball bearing 41b is fixed to the cam portion 41a, and an outer ring thereof is arranged to be deformed elastically through balls. The flexspline 42 is an endless, flexible member with teeth formed in the peripheral portion thereof and is mounted on the outer ring of ball bearing 41b in the wave generator 41. The circular spline 43 has teeth formed at the same pitch as that of the flexspline 42 and on the inside periphery thereof.

This flexspline 42 is deformed in an elliptic shape by the wave generator 41 and is in mesh with the inside teeth of the circular spline 43 at two positions of the both ends of the major axis of ellipse. When the wave generator 41 is driven to rotate by the print motor 30, these meshing positions will move successively along the circumferential direction. Since the number of teeth of the flexspline 42 is 2 n (n is an integer) smaller than that of the circular spline 43, relative rotation will occur between the flexspline 42 and the circular spline 43 with movement of the meshing positions. In the embodiment of FIG. 1, since a holding ring denoted by reference numeral 44 holds the flexspline 42 so as to prevent rotation thereof, the circular spline 43 is driven to rotate with the movement of meshing positions.

Here, the operation of the power steering apparatus constructed as described above will be described schematically. When the steering torque is applied to the steering input shaft 11, a twist in an amount according to this steering torque appears between the steering input shaft 11 and the steering output shaft 12. This twist amount is detected by the steering torque sensor 20 and the print coil 33 of the print motor 30 is driven to rotate based on this detection signal. Then the wave generator 41 of the harmonic drive reducer 40 is driven to rotate by this print coil 33, so that the circular spline 43 is driven to rotate in the same direction as the steering input shaft 11 by the aforementioned action. When the circular spline 43 is driven to rotate, the steering assist force is supplied to the steering output shaft 12.

Since this arrangement of the power steering apparatus permits the motor and reducer for generating the steering assist force to be all arranged coaxially around the steering axis, the whole apparatus can be constructed in the compact shape and the mountability of the power steering apparatus can be enhanced.

Figure 3:
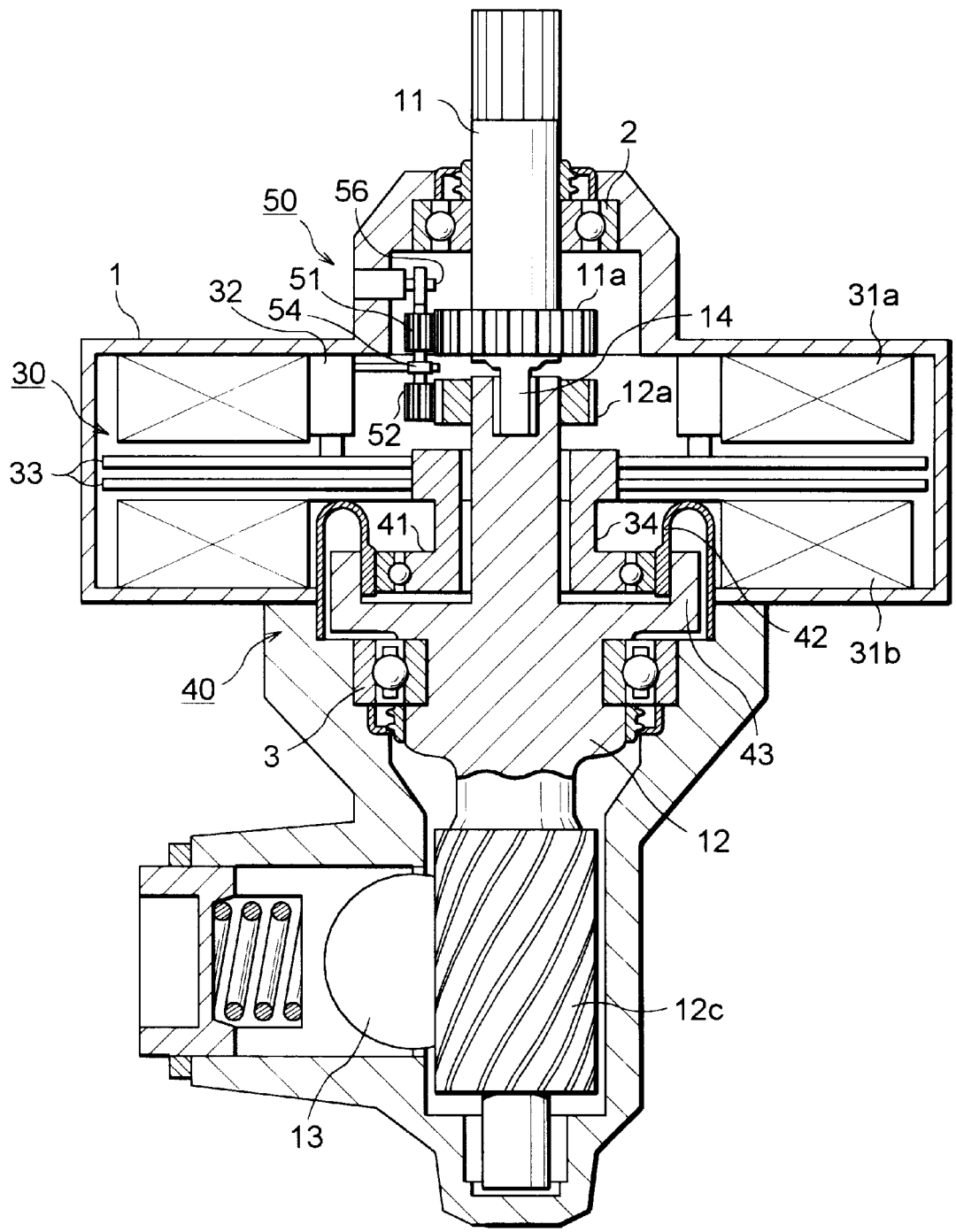
FIG. 3 is a cross-sectional view to show the power steering apparatus according to the second embodiment.

The power steering apparatus according to the second embodiment is shown in FIG. 3. In each embodiment and corresponding drawing thereof described hereinafter, components having the same functions will be denoted by the same reference symbols and description thereof will be omitted.

The print motor 30 in this power steering apparatus is arranged in such an arrangement that magnets 31a, 31b of different polarities are disposed opposite to each other in the orientation along the steering axis and that two print coils 33 are placed between them. The print coils 33 are electrically connected with each other at the base end thereof and are constructed in such structure that the power is supplied to the both print coils 33 by keeping the brush 32 in contact with one print coil 33. The both print coils 33 and the wave generator 41 are integrally connected through the motor output shaft 34.

The flexspline 42 forming the harmonic drive reducer is provided in such a state that an opening end thereof, opposite to the side where it is mounted to the peripheral portion of wave generator 41, is folded back outside, and the tip portion thus folded is fixed to the housing 1. This folding arrangement of flexspline 42 can keep sufficient the total length of flexspline 42 disposed in a certain limited range (the length between the two opening ends), whereby the opening end on the side where it is mounted to the peripheral portion of wave generator 41 can be deformed sufficiently.

Figure 4:
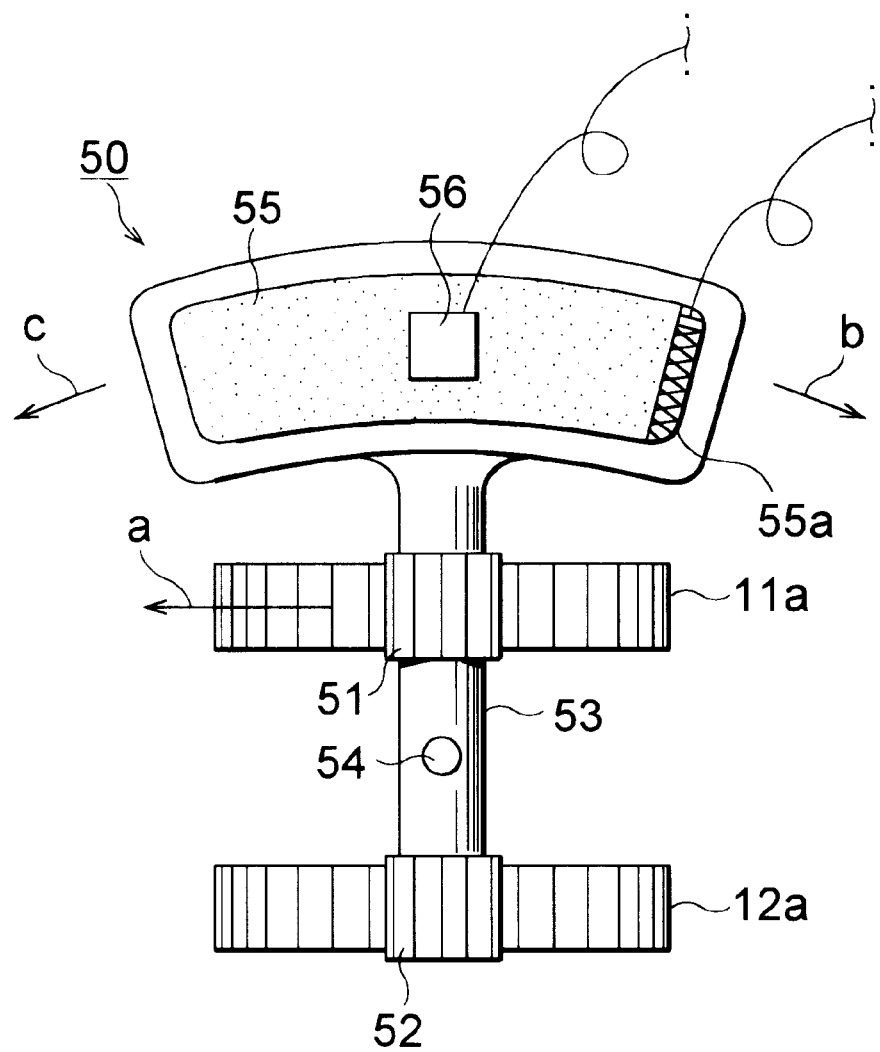
FIG. 4 is a plan view to show the structure of the steering torque sensor.

Here, an enlarged view of the structure of steering torque sensor 50 shown in FIG. 3 is given in FIG. 4. Gear 11a is coaxially fixed to the steering input shaft 11 and gear 12a is also coaxially fixed to the steering output shaft 12. Small gears 51, 52 are in mesh with the two gears 11a, 12a. The small gears 51, 52 are rotatably supported by support shaft 53 extending through the small gears 51, 52, and this support shaft 53 is supported by pin 54 fixed at one end to the housing 1 so as to be rockable about this pin 54. The tip portion of the support shaft 53 spreads in a fan shape and resistor film 55 is formed on this surface. Electrode 55a connected to the resistor film 55 is formed at one end of the resistor film 55. In addition, electrode 56 supported on the housing 1 side is in contact with and on this resistor film 55, thereby forming a mechanism to allow electric current flow between the electrode 55a and the electrode 56 through the resistor film 55.

Since the steering input shaft 11 and steering output shaft 12 are connected through the torsion bar 14 as shown in FIG. 3, when the steering torque is supplied to the steering input shaft 11, the steering input shaft 11 and steering output shaft 12 are twisted relative to each other according to this torque. Let us assume herein that the steering input shaft 11 is twisted relative to the steering output shaft 12 along the direction of arrow (a) (see FIG. 4). Then the gear 11a rotates along the direction of arrow (a) together with the steering input shaft 11. On this occasion, the small gear 51 also rotates, and this small gear 51 is displaced to the side of arrow (a) because of engaging force with the gear 11a, whereby the support shaft 53 rocks in the direction of arrow (b) about the pin 54. This results in making the electrode 55a closer to the electrode 56, so that the resistance between them decreases. When the steering torque is given in the direction along the opposite direction to arrow (a) to the steering input shaft 11, the support shaft 53 rocks in the direction of arrow (c) by similar action, so that the distance between the electrode 55a and the electrode 56 increases, thereby increasing the resistance between them. When the steering torque becomes zero, no twist occurs between the input shaft 11 and the steering output shaft 12, and they return to their regular positions shown in FIG. 4. Since the rocking angle and rocking direction of the support shaft 53 change according to the amount and direction of relative twist between the steering input shaft 11 and the steering output shaft 12, i.e., according to the steering torque as described above, the steering torque sensor 50 detects the steering torque, based on the resistance between the electrode 55a and the electrode 56.

Figure 5A:
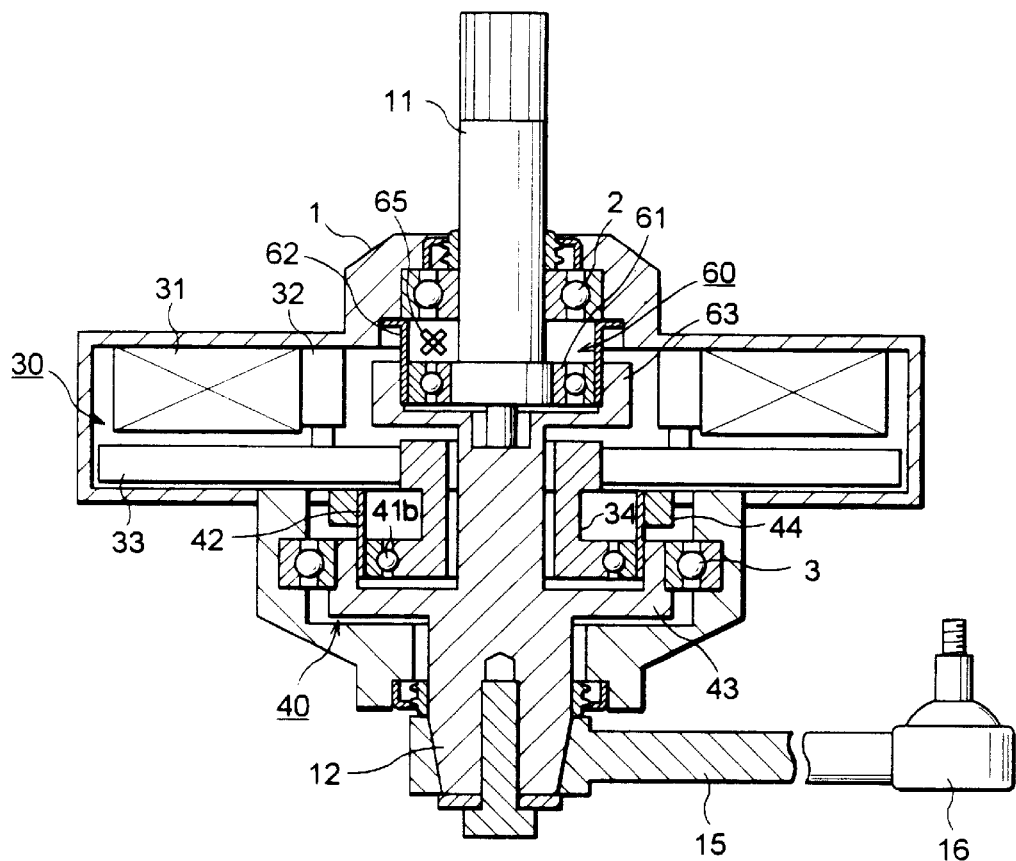
FIG. 5A is a cross-sectional view to show the power steering apparatus according to the third embodiment and FIG. 5B is a plan view to show the connected state of the steering output shaft.
Figure 5B:
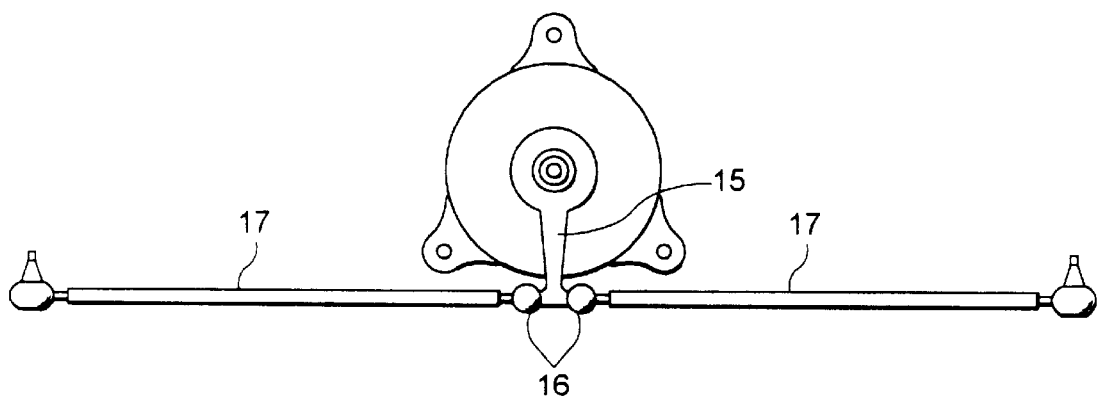

The power steering apparatus according to the third embodiment is shown in FIGS. 5A and 5B.

In this power steering apparatus, arm 15 is connected to the steering output shaft 12 and tie rods 17 are connected through ball joint 16 to this arm 15, thereby constituting a so-called center takeoff type steering.

This power steering apparatus has another harmonic drive reducer 60 composed of wave generator 61, flexspline 62, and circular spline 63, in addition to the harmonic drive reducer 40. The structures of the individual elements and the like are the same as those of the respective wave generator 41, flexspline 42, and circular spline 43 and description thereof is thus omitted herein.

As illustrated, the steering input shaft 11 and steering output shaft 12 are connected through this harmonic drive reducer 60. Specifically, the wave generator 61 is fixed to the peripheral portion of steering input shaft 11, so as to rotate together with the steering input shaft 11. The flexspline 62 fixed on one opening end side to the housing 1 is mounted to the peripheral portion of wave generator 61 and the circular spline 63 connected to the steering output shaft 12 is disposed on the peripheral portion of the flexspline 62. Accordingly, the circular spline 43 and circular spline 63 both are connected to the steering output shaft 12 so that their rotation driving forces drive to rotate the steering output shaft 12 in cooperation with each other. A reduction ratio of each reducer is determined, for example, in such a way that the reduction ratio of harmonic drive reducer 60 is 1/30 and that the reduction ratio of harmonic drive reducer 40 is 1/60.

Rotation control of the print motor 30 for driving the harmonic drive reducer 40 is carried out based on a detection signal of strain gage 65 provided on the flexspline 62.

The strain gage 65 is of a cross arrangement of gages inclined at 45° to the steering input shaft 11 and is placed on the inside periphery of the flexspline 62, thereby detecting torsional torque applied to the flexspline 62. Then the magnitude of the steering torque applied to the input shaft 11 is obtained from this detection result.

The principle of this detection will be described. The driving torque proportional to the steering torque applied to the steering input shaft 11 is applied to the circular spline 63, and reaction of this driving torque is received by the flexspline 62. Since the flexspline 62 is fixed at the upper opening end in the drawing to the housing 1, this reaction acts to twist the flexspline 62. Therefore, the driving torque of the circular spline 63 can be detected by detecting the torsional torque on the flexspline 62 by the strain gage 65, and thus the steering torque applied to the steering input shaft 11 can be obtained by inverse operation from this detection result.

The additional arrangement of the harmonic drive reducer 60 provided with the strain gage 65 as described above permits rotation applied to the steering input shaft 11 to be transmitted to the steering output shaft 12 as reducing the speed thereof and also permits the steering torque applied to the steering input shaft 11 to be detected.

Figure 6:
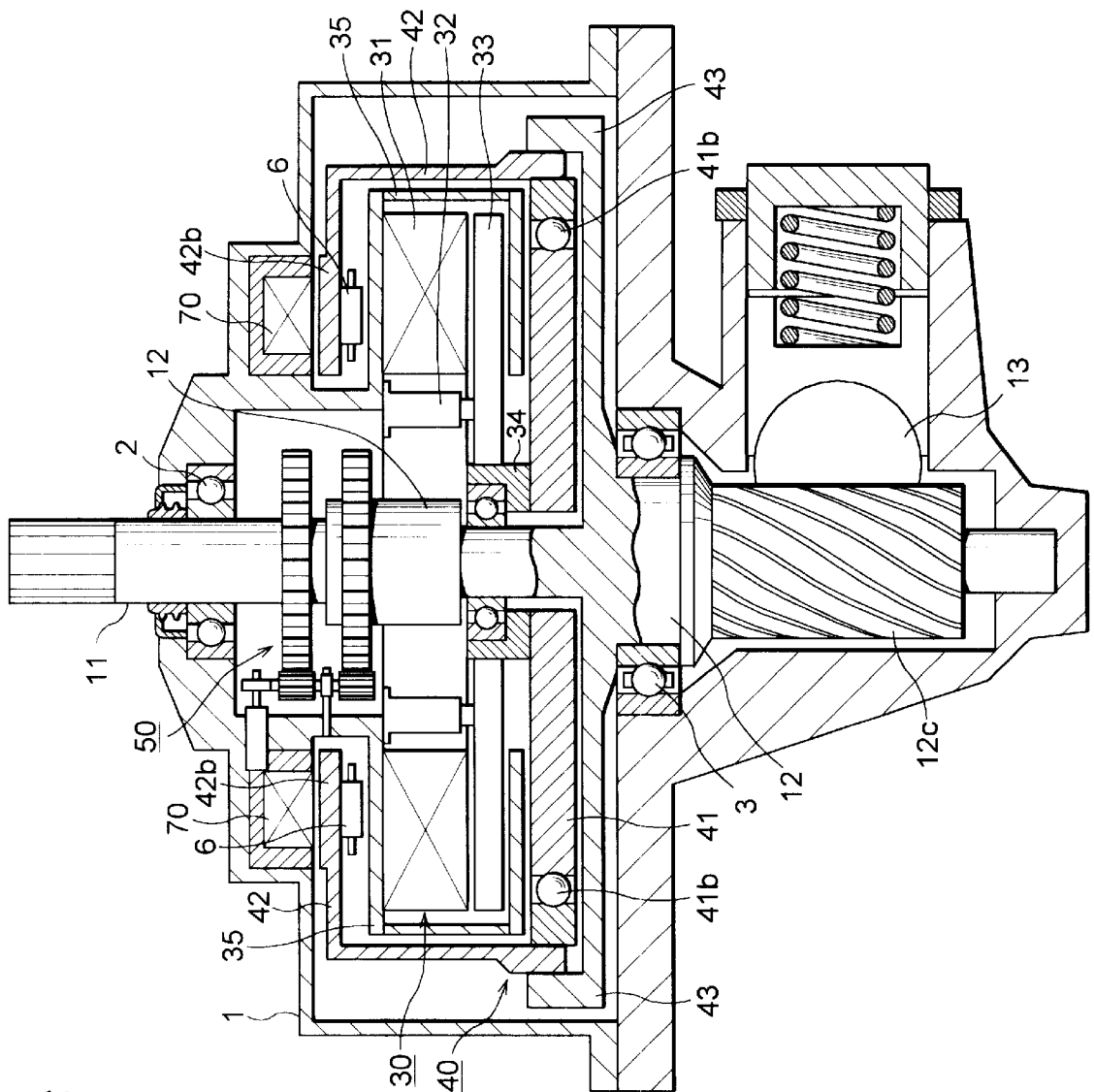
FIG. 6 is a cross-sectional view to show the power steering apparatus according to the fourth embodiment.

The power steering apparatus according to the fourth embodiment is shown in FIG. 6.

This power steering apparatus is arranged so that the flexspline 42 forming the harmonic drive reducer 40 is formed in such a cup shape that the upper opening side in the drawing is bent to the inside, and the apparatus has electromagnetic clutch 70 as a torque limiting mechanism at such a position as to face opening edge 42b of the flexspline 42.

This electromagnetic clutch 70 is fixed to the housing 1 and has an exciting coil inside thereof. Therefore, when the power is supplied to the exciting coil, magnetic force is generated to fix the opening edge 42b to the electromagnetic clutch 70. Namely, the flexspline 42 is fixed to the housing 1 side. When the power supply to the exciting coil is stopped, the magnetic force disappears, thereby releasing the flexspline 42 having been fixed to the housing 1 side.

The action of the electromagnetic clutch 70 will be described.

First, in the state wherein the flexspline 42 is fixed to the electromagnetic clutch 70, when the wave generator 41 is driven to rotate by the print motor 30, the meshing positions between the flexspline 42 and the circular spline 43 move along the circumferential direction and the circular spline 43 is driven to rotate with this movement, thereby giving the steering assist force to the steering output shaft 12 in the same manner as in the above-stated embodiments.

In contrast with it, if the motor output shaft 34 is locked because of a breakdown of print motor 30 or the like, the wave generator 41, flexspline 42, circular spline 43, and steering output shaft 12, which are connected to this motor output shaft 34, all will be locked to disable steering. In such cases, the power supply to the exciting coil is stopped to disconnect the electromagnetic clutch 70, thus releasing the constraint of the flexspline 42. This brings the flexspline 42, circular spline 43, and steering output shaft 12, connected after the ball bearing 41b of the wave generator 41, into a rotatable state. Owing to this, rotation of the steering input shaft 11 is transmitted through the torsion bar to the steering output shaft 12, so that the steering output shaft 12 rotates together with the circular spline 43 and flexspline 42. Since on this occasion the opening edge 42b is rotatably supported through bearing 6 on inner housing 35 housing the print motor 30, it does not constitute a hindrance against rotation.

As described above, it becomes possible to continuously perform the steering operation even in the event that the motor output shaft 34 is locked.

A condition for releasing the constraint of the flexspline 41 by the electromagnetic clutch 70 is, for example, an event in which great steering torque over a fixed value is detected by the steering torque sensor 50 (see FIG. 3 or FIG. 4), because upon locking of the motor output shaft 34 the great steering torque is applied to the steering input shaft 11 to continue steering. Another condition is an event in which the breakdown of print motor 30 is detected by a control circuit of print motor 30. If the constraint of the flexspline 41 is released where the steering torque supplied to the steering input shaft 11 is close to zero, the steering operation can be prevented from being affected by the inertial force of the print motor 30 and the frictional force between the brush 32 and the print coil 33, which can improve the steering feeling.

Figure 7:
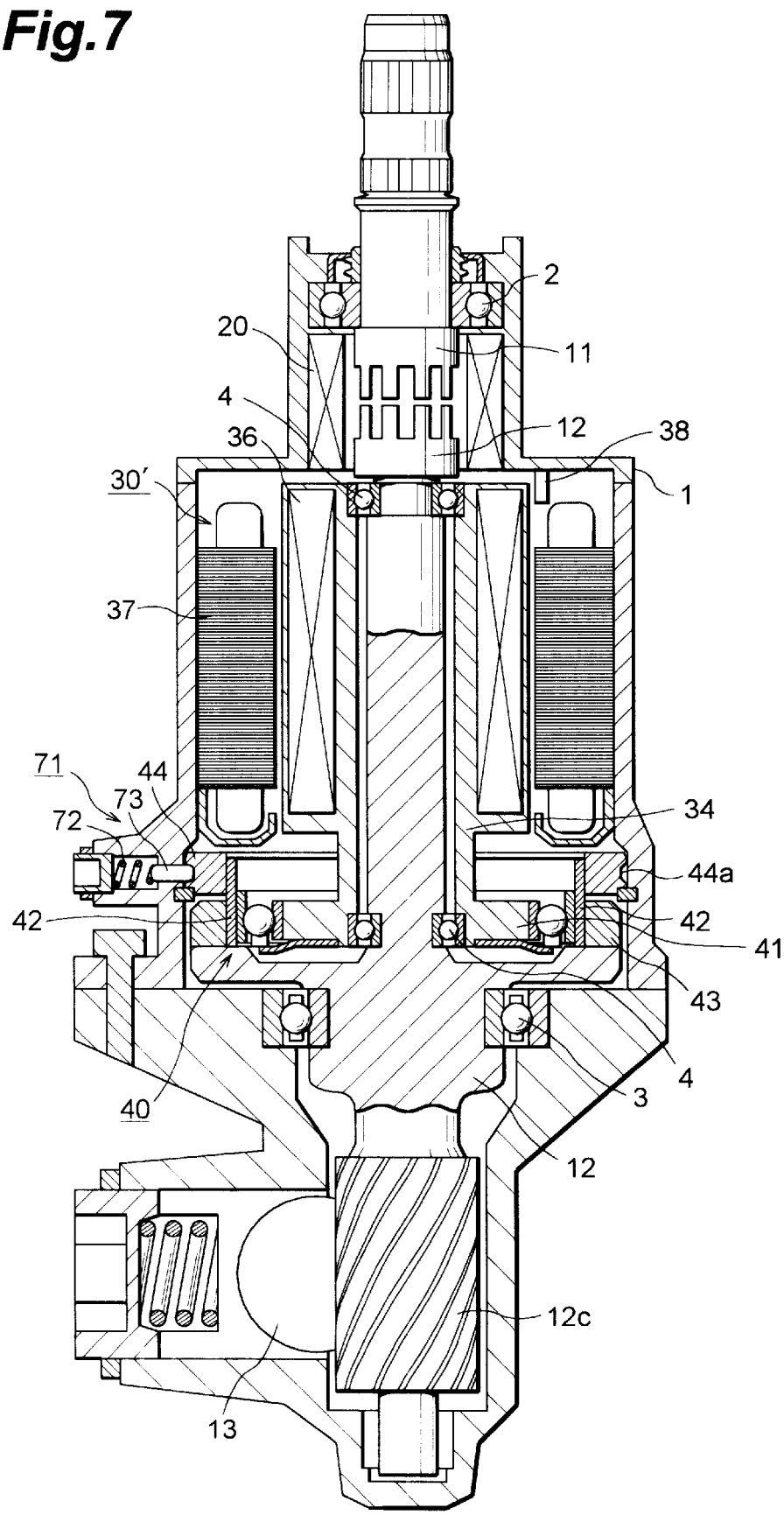
FIG. 7 is a cross-sectional view to show the power steering apparatus according to the fifth embodiment.

The power steering apparatus according to the fifth embodiment is shown in FIG. 7.

In this power steering apparatus, the motor for driving the harmonic drive reducer 40 is a brushless motor 30'. This brushless motor 30' is constructed in such an arrangement that magnet 36 constituting the rotor part is located around the steering output shaft 12 and on the peripheral portion thereof and that coil 37 constituting the stator part is located outside of the magnet 36, and it thus has the shape to extend along the axial direction. In the drawing reference numeral 38 denotes a rotation sensor for detecting rotation of the rotor part.

The wave generator 41 of the harmonic drive reducer 40 is directly connected to the motor output shaft 34 of this brushless motor 30' and these are rotatably supported by bearings 4 provided between them and the steering output shaft 12.

This power steering apparatus also has torque limiter 71 as a torque limiting mechanism. This torque limiter 71 is composed of engaging pin 73 set with a play in a holding hole formed in the housing 1, spring 72 for energizing the engaging pin 73 toward the holding ring 44 for holding the flexspline 42, and depression 44a formed in the peripheral portion of the holding ring 44. There are a plurality of such depressions 44a formed at predetermined intervals in the peripheral portion of the holding ring 44. In the state of FIG. 7, the tip of the engaging pin 73 engages with the depression 44a, so that the holding ring 44 is held at the illustrated position by engaging force determined by the energizing force of spring 72 and the shape of depression 44a.

Now, the action of torque limiter 71 will be described. For example, when the brushless motor 30' is locked because of the breakdown or the like, the great steering torque is given to the steering input shaft 11 to continue steering. Since this steering torque is applied to the steering output shaft 12 connected through the torsion bar 14 (see FIG. 3), great driving torque is exerted on the circular spline 43 of the harmonic drive reducer 40 and reaction of this force is applied to the holding ring holding the flexspline 42. When greater torque than the engaging force between the engaging pin 73 and the depression 44a is applied to the holding ring 44, the holding ring 44 starts rotating as pushing the engaging pin 73 up by the taper face of depression 44a. This rotates the flexspline 42, circular spline 43, and steering output shaft 12, whereby the steering operation can be continued.

Provision of the torque limiter 71 described above permits the steering operation to be continued even in the event that the brushless motor 30' is locked because of the breakdown.

Figure 8:
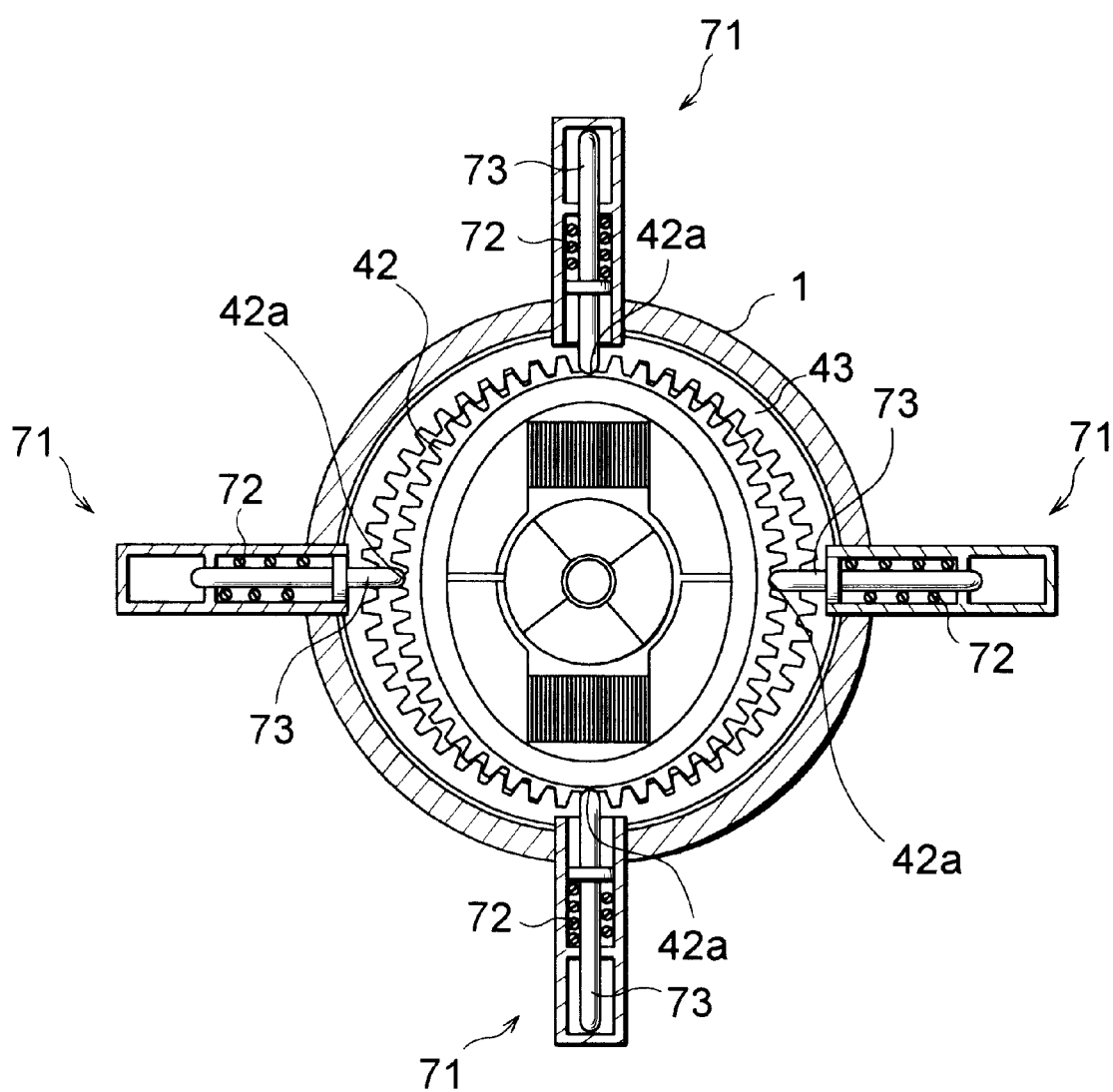
FIG. 8 is a cross-sectional view to show the power steering apparatus according to the sixth embodiment.

As illustrated as the sixth embodiment in FIG. 8, another torque limiting mechanism having the same function as in the fifth embodiment can also be constituted by flexspline 42 and torque limiter 71 without using the holding ring 44. Specifically, depressions 42a are formed at predetermined intervals in the peripheral portion of flexspline 42 along the region where the teeth of flexspline 42 are formed, and torque limiters 71 are placed around the housing 1 (for example, at four positions). Then the flexspline 42 is held by engaging the tips of engaging pins 73, elastically projecting because of the action of springs 72, with the depressions 42a of the flexspline 42.

This arrangement can keep the flexspline 42 in position as the engaging pins 73 project or retract according to deflection of flexspline 42. Further, when greater torque than the engaging force between the engaging pins 73 and the depressions 42a is applied to the flexspline 42, the flexspline 42 starts rotating while the taper faces making the depressions 42a push the engaging pins 73 up, thus presenting the same functional effect as in the fifth embodiment.

Figure 9:
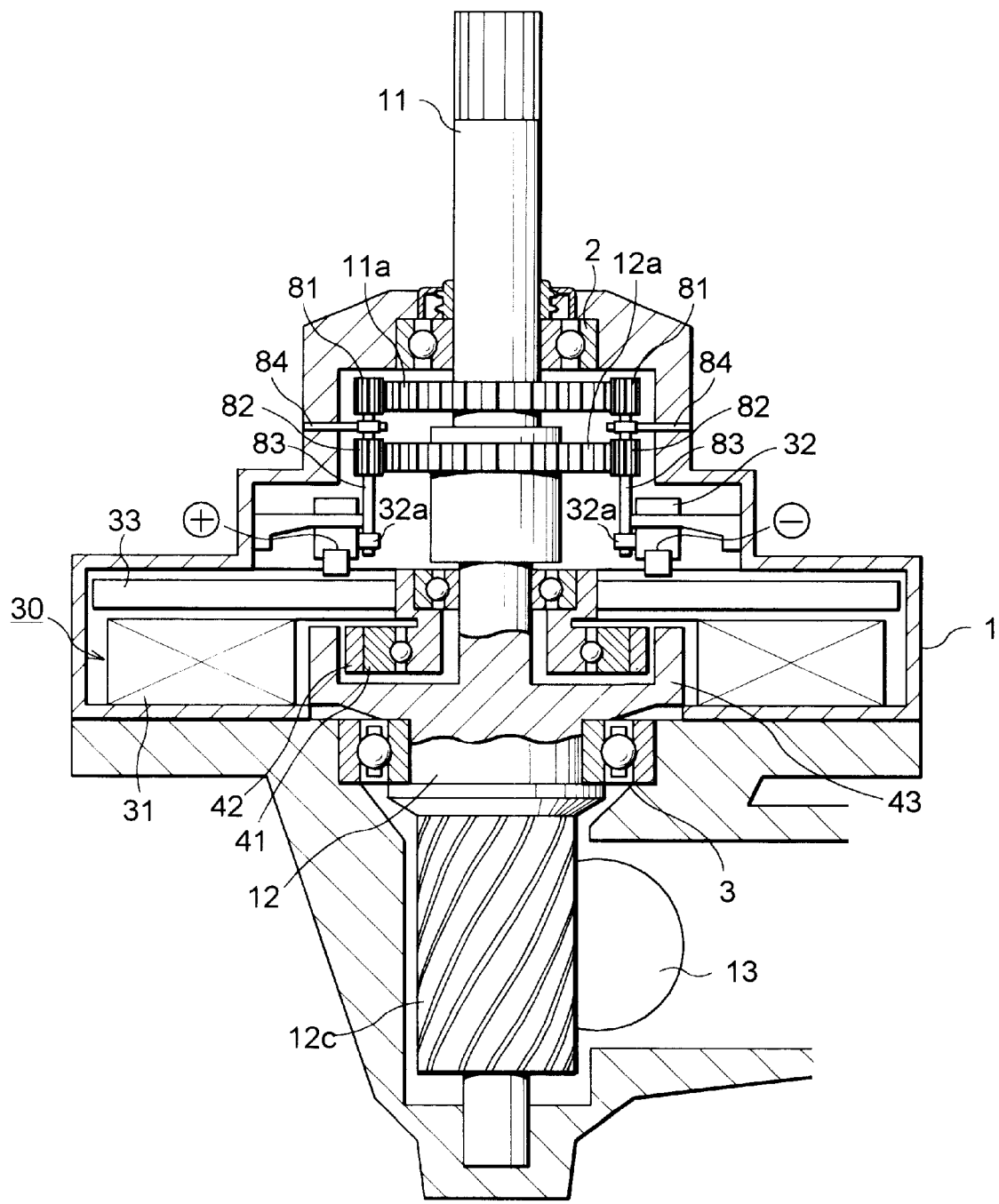
FIG. 9 is a cross-sectional view to show the power steering apparatus according to the seventh embodiment.

The power steering apparatus according to the seventh embodiment is shown in FIG. 9.

Gear 11a is coaxially fixed to the steering input shaft 11 and gear 12a is also coaxially fixed to the steering output shaft 12. Small gears 81, 82 are in mesh with the associated gear on the both sides of the two gears 11a, 12a. The small gears 81, 82 are rotatably supported by support shafts 83 extending through the small gears 81, 82 and each of the support shafts 83 is supported by pin 84 fixed at one end thereof to the housing 1 so as to be rockable about the pin 84.

As shown, for example, in an enlarged view of FIG. 10A, the tip portion of the support shaft 83 extends up to a side face of brush 32 and is freely set between two guide pins 32a projecting from this side face of brush 32. The brush 32 is supported by the support shaft 85 fixed to the housing 1 so as to be rockable about the support shaft 85. The brush 32 is provided with electrode p1 of the plus polarity and electrode p2 of the minus polarity formed on the both sides of insulator p3.

Since the steering input shaft 11 and steering output shaft 12 are connected through the torsion bar, when the steering torque is given to the steering input shaft 11, the steering input shaft 11 and steering output shaft 12 are twisted relative to each other according to this torque. When the steering torque is zero, no relative twist exists as shown in FIG. 10A and the insulator p3 of the brush 32 is in contact with the print coil 33.

Here, when the steering input shaft 11 is twisted relative to the steering output shaft 12 along the direction of arrow (d) as shown in FIG. 10B (when the steering wheel is turned to the right), the gear 11a rotates together with the steering input shaft 11 along the direction of arrow (d). On this occasion, the small gears 81 also rotate, and the small gears 81 are displaced in the direction of arrow (d) by the engaging force with the gear 11a, whereby the support shafts 83 rock as shown in FIG. 10B about the pins 84. The lower end of each support shaft 83 pushes the guide pin 32a located on the rocking side to rock the brush 32 in this direction. This brings one electrode p2 of brush 32 into contact with the print coil 33. When the steering input shaft 11 is twisted relative to the steering output shaft 12 along the direction of arrow (e) as shown in FIG. 10C (when the steering wheel is turned to the left), the other electrode p1 of the brush 32 is brought into contact with the print coil 33 by similar action.

Since the electrode of brush 32 in contact with the print coil 33 can be switched to the other according to the steering direction by making use of the relative twist between the steering input shaft 11 and the steering output shaft 12 as described above, the rotation control of the print motor 30 can be performed on a mechanical basis. This enables to carry out the rotation control of print motor 30 by the simple structure without a need for separately providing a torque sensor, a steering-direction sensor, and so on.

Figure 11:
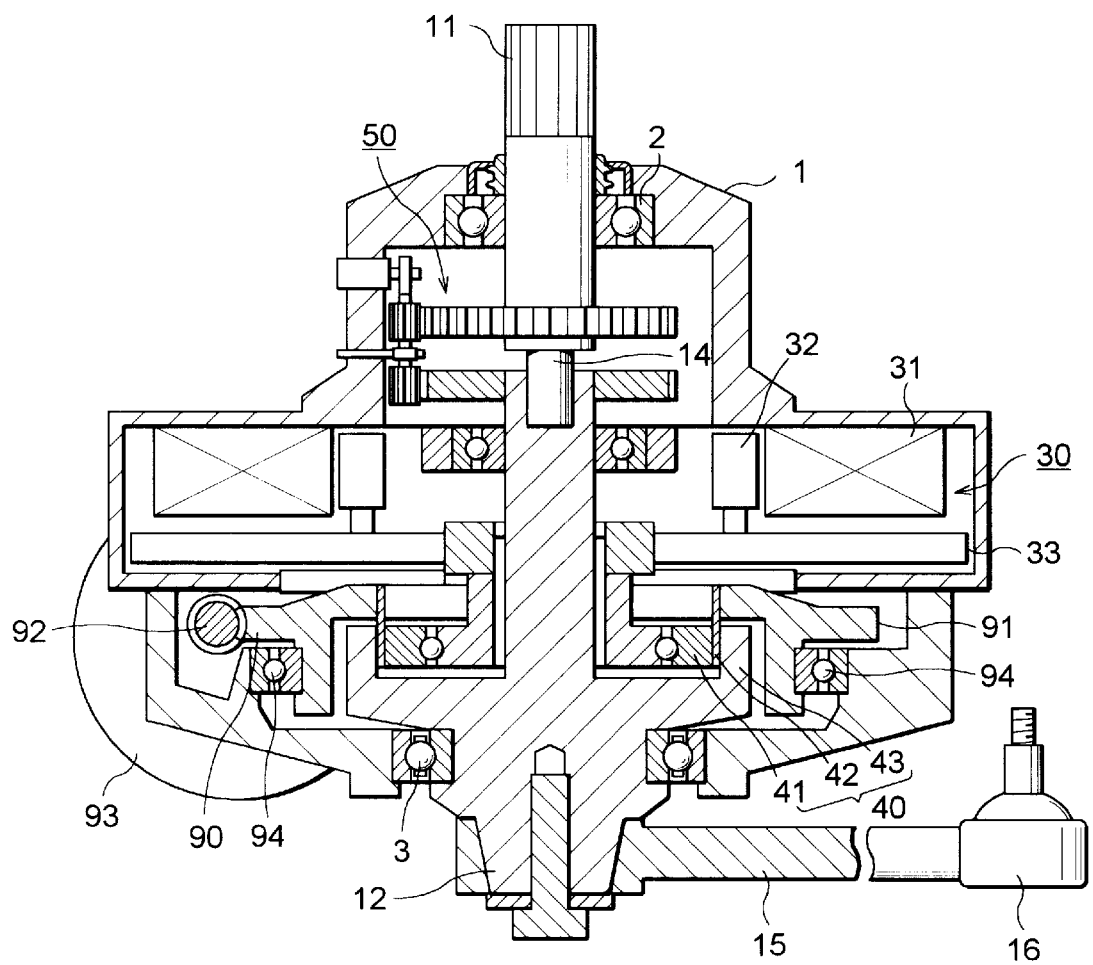
FIG. 11 is a cross-sectional view to show the power steering apparatus according to the eighth embodiment.

The power steering apparatus according to the eighth embodiment is shown in FIG. 11.

This power steering apparatus has worm wheel 90 in the peripheral portion of which worm gear 91 is formed, and the flexspline 42 is integrally held on the inside periphery of this worm wheel 90. Worm shaft 92 driven to rotate by motor 93 is in mesh with the worm gear 91 of the worm wheel 90. When the worm shaft 92 is rotated, the worm wheel 90 and flexspline 42 are driven to rotate about the steering output shaft 12. The worm wheel 90 is rotatably supported by bearing 94 provided between it and the housing 1.

In this arrangement, while the steering assist force is supplied through the harmonic drive reducer 40 to the steering output shaft 12, this steering assist force can be increased or decreased by driving to rotate the worm wheel 90 and flexspline 42 forward or backward. This is the same result as change in the gear ratio of the harmonic drive reducer 40, and this mechanism can arbitrarily change the steering angle ratio.

In addition, since the steering output shaft 12 can be driven to rotate through the flexspline 42 and circular spline 43 by driving to rotate the worm wheel 90, it is also possible to carry out auxiliary steering by making use of such a mechanism.

Figure 12:
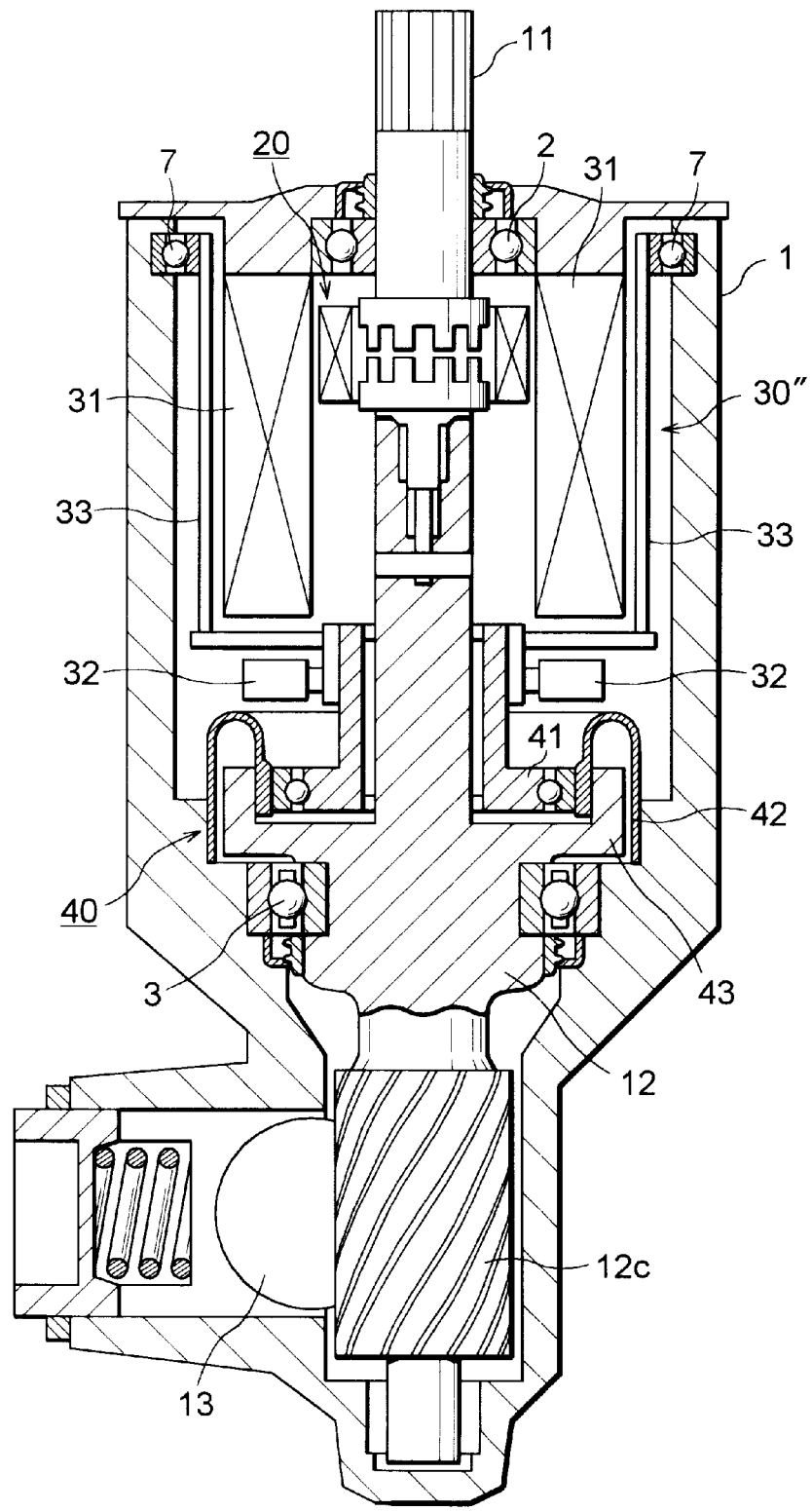
FIG. 12 is a cross-sectional view to show the power steering apparatus according to the ninth embodiment.
Figure 13:
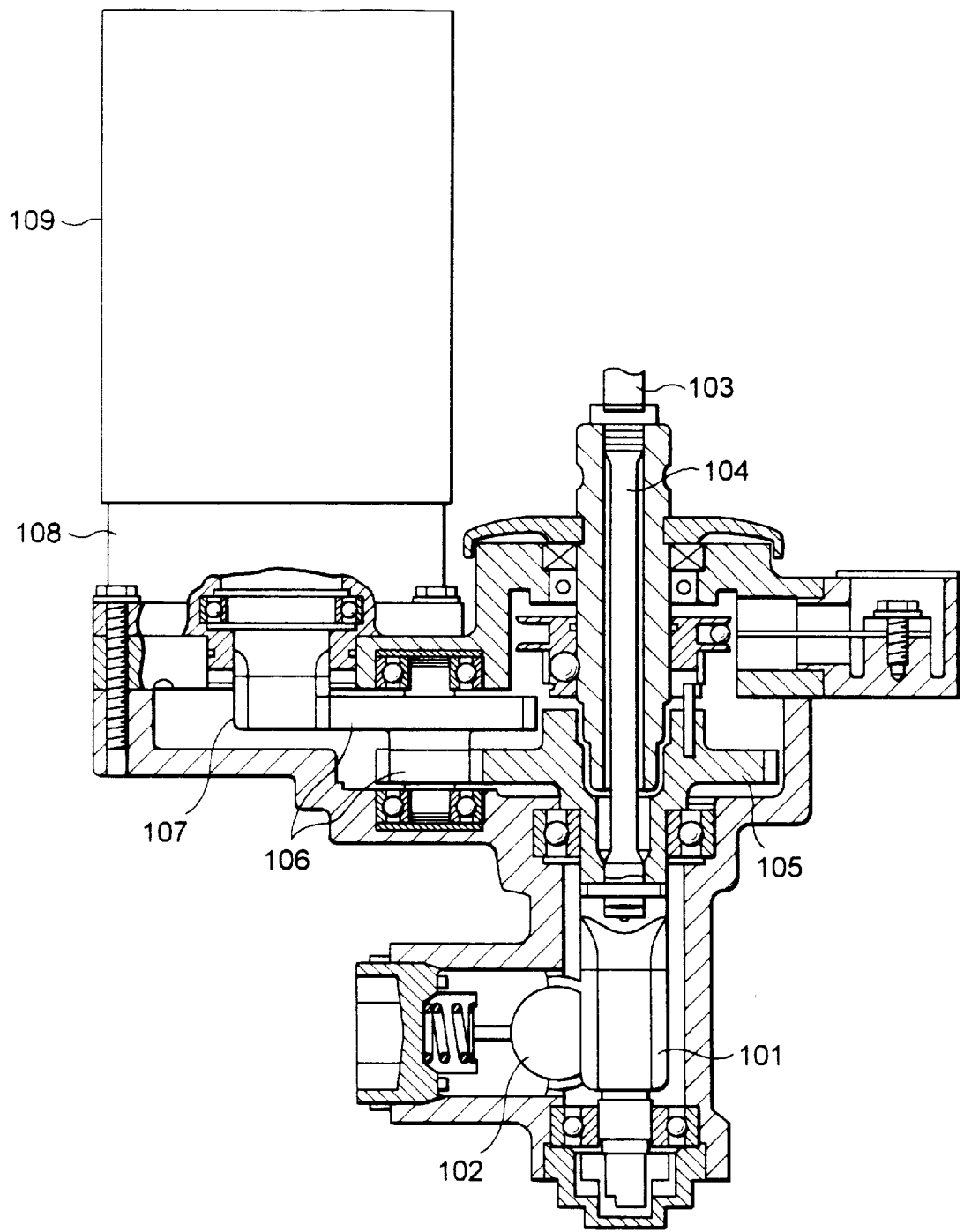
FIG. 13 is a cross-sectional view to show the conventional power steering apparatus.

The power steering apparatus according to the ninth embodiment is shown in FIG. 12.

In this power steering apparatus, the motor part for driving the harmonic drive reducer 40 is constructed as coreless motor 30", the print coil 33 is formed in a cylindrical shape, and the magnet 31 is disposed inside thereof. The opening end of the cylindrical print coil 33 is rotatably supported by bearing 7 provided between it and the housing 1 disposed outside thereof.

When the motor part for driving the harmonic drive reducer 40 is constructed of such a coreless motor, the magnet 31 and print coil 33 are shaped to extend along the direction of the center axis of motor, i.e., along the direction of the steering axis. This can decrease the outer diameter of the motor and can enhance the mountability further. FIG. 12 illustrates the example of the arrangement wherein the magnet 31 is disposed inside the print coil 33, but the magnet 31 can also be disposed outside of the print coil 33.

As described above, since the power steering apparatus according to each claim is arranged so that the so-called harmonic drive reducer, composed of the wave generator, flexspline, and circular spline, and the motor for driving this harmonic drive reducer are arranged coaxially about the serial steering axis connecting the steering input shaft with the steering output shaft, the whole of apparatus can be constructed as integrated and the whole of apparatus can be compact, whereby the mountability can be enhanced considerably.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A power steering apparatus, comprising:

a steering input shaft to be rotated about an axis of rotation;

a steering output shaft axially aligned with said steering input shaft;

a motor arranged between said steering input and output shafts and having an output shaft disposed concentrically about said steering output shaft, said motor being driven in response to said steering input shaft rotation;

a wave generator connected to the motor output shaft;

an elastically deformable flexspline surrounding a peripheral portion of said wave generator; and a circular spline connected to said steering output shaft, being in meshed engagement with said flexspline, wherein said wave generator is rotatable; said wave generator, said flexspline and said circular spline are arranged coaxially about the axis of rotation; and at least one of said flexspline and said circular spline is rotatable about the axis of rotation.

2. A power steering apparatus according to claim 1, wherein said motor is a print motor and wherein said wave generator is connected to a rotor of said print motor.

3. A power steering apparatus according to claim 1, wherein said flexspline has such a shape that an opening end thereof is folded back on the exterior of said flexspline.

4. A power steering apparatus according to claim 1, further comprising:

a second wave generator arranged to be rotated by said steering input shaft, a second flexspline mounted to a peripheral portion of said second wave generator and arranged to be deformed elastically by said second wave generator under rotation, a second circular spline arranged to be rotated in mesh with said second flexspline and connected to said steering output shaft, and torque detecting means disposed with respect to said second flexspline and arranged to detect torsional torque applied to said second flexspline.

5. A power steering apparatus according to claim 1, further comprising torque limiting means for releasing constraint of said flexspline.

6. A power steering apparatus according to claim 2, comprising:

a displacing member arranged to undergo displacement by a relative twist between said steering input shaft and said steering output shaft, and a brush having electrodes of mutually different polarities, said brush being arranged to switch said electrodes in contact with the rotor of said print motor when driven to undergo displacement by said displacing member.

7. A power steering apparatus according to claim 1, further comprising driving means for driving said flexspline in rotation.

8. A power steering apparatus according to claim 1, wherein said motor is a coreless motor having a tubular rotor.

9. A power steering apparatus according to claim 1, wherein said wave generator includes an elliptical cam.

* * * * *